(No Model.)

H. M. HALL.
BEARING PIN OR STUD FOR MACHINERY.

No. 253,375. Patented Feb. 7, 1882.

WITNESSES:
A. P. Grant
W. F. Kircher

INVENTOR:
Henry M. Hall
BY John A. Diedersheim
ATTORNEY.

UNITED STATES PATENT OFFICE.

HENRY M. HALL, OF PHILADELPHIA, PENNSYLVANIA, ASSIGNOR OF ONE-HALF TO WM. HUEY, OF CAMDEN, NEW JERSEY.

BEARING PIN OR STUD FOR MACHINERY.

SPECIFICATION forming part of Letters Patent No. 253,375, dated February 7, 1882.

Application filed November 7, 1881. (No model.)

*To all whom it may concern:*

Be it known that I, HENRY M. HALL, a citizen of the United States, residing in the city and county of Philadelphia, State of Pennsylvania, have invented a new and useful Improvement in Bearing Pins or Studs for Machinery, which improvement is fully set forth in the following specification and accompanying drawings, in which—

Figure 1:
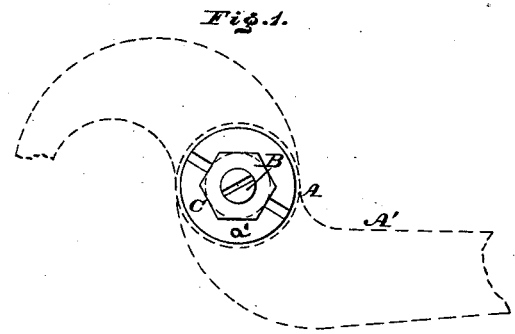
Figure 2:
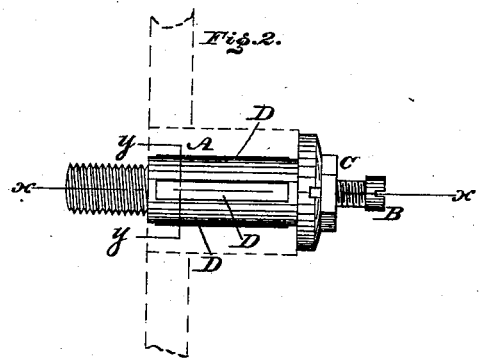
Figure 3:
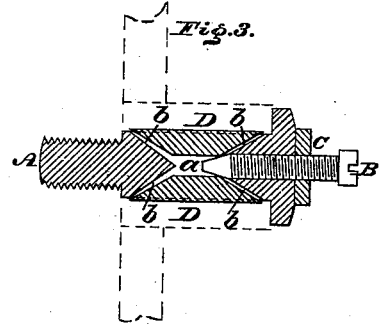
Figure 4:
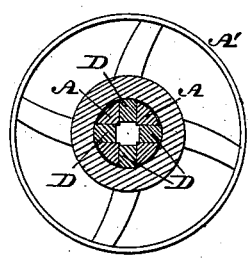

Figure 1 is an end view of the bearing pin or stud embodying my invention. Fig. 2 is a side elevation thereof. Fig. 3 is a longitudinal section thereof in line $x$ $x$, Fig. 2. Fig. 4 is a section in line $y$ $y$, Fig. 2, the stud supporting a pulley. In the other figures the moving or running piece is shown dotted, of the form of an oscillating arm.

Similar letters of reference indicate corresponding parts in the several figures.

My invention consists in fitting an oscillating or rotatable piece of machinery on a stationary bearing pin or stud which is provided with movable gibs or brasses, which constitute part of the surface of the pin or stud on which said piece runs, whereby, when said surface or the opening of the piece of machinery is worn or requires adjustment, the gibs are extended so as to provide a new surface or bearing on which the piece may continue to run, thus avoiding the loss of the stud or piece. When the gibs are worn they may be removed and replaced, so that the stud may be continued still further in use.

Referring to the drawings, A represents a stationary bearing pin or stud, and A' a rocking arm, wheel, or other oscillating or rotatable piece of machinery, said stud being securely and rigidly connected in position and the piece A' running on the stud. In the center of the stud, in the longitudinal direction thereof, is a threaded opening or bore, $a$, and in the circumference is a series of slots, $b$, formed at intervals, likewise extending longitudinally and communicating with said bore $a$.

B represents a screw or screw-bolt, which engages with the threaded bore $a$, and is adapted to screw in and out of the same; and C represents a jam-nut, which is fitted on the screw B and adapted to tighten against the head of the stud A for securely holding said screw B.

In the slots $b$ are placed movable gibs or brasses D, which, when in position, have their outer faces flush with the periphery or surface of the stud A, and the inner faces of the gibs are adapted to be engaged by the point of the screw B in the bore $a$, as more clearly shown in Fig. 3, it being seen that the surface of the stud and the outer faces of the gibs alternate.

The operation is as follows: When the rocking arm, wheel, or other oscillating or rotatable piece A' of machinery is fitted on the stud A it may run thereon in well-known manner. Should the piece not fit snugly on the stud owing to the greater diameter of the boss or opening of the former, the screw B is rotated so that its point forces the gibs outwardly, whereby there is a sufficient or comparatively an increased bearing-surface imparted to the stud. When the exterior surfaces of the gibs or the inner surface of the boss wear away the screw B is rotated, and the gibs are thereby advanced or forced outwardly, thus increasing the diameter of the stud or providing a new surface for the stud sufficient for the requirements of the worn or increased diameter of the boss of the running piece, as shown in Fig. 4. By these means the regularity of operation of the piece on the pin is maintained, and there is no rattling of parts or lost motion of the movable piece as it runs on the bearing-stud. When the gibs are adjusted the screw B retains its position by means of the jam-nut C, which, as has been stated, is tightened against the pin A.

I do not lay any claim to the jam-nut, as it is a well-known expedient for holding a screw, and while it is useful it is not a necessity.

I am aware that it is not new to connect a wheel and shaft by movable pieces which are tightened against the wheel, so that the wheel and shaft rotate as one; but this feature forms no part of the present invention, and is therefore disclaimed; but,

Having thus fully described my invention, what I do claim as new, and desire to secure by Letters Patent, is—

A stationary bearing pin or stud, in combination with a piece adapted to run thereon, said studs having gibs adjustable at the periphery thereof, on which said piece runs, substantially in the manner and for the purpose set forth.

HENRY M. HALL.

Witnesses:
JOHN A. WIEDERSHEIM,
A. P. GRANT.